United States Patent

Pennig

[11] 4,053,261
[45] Oct. 11, 1977

[54] IMPELLER FOR A HIGH-SPEED TURBOMACHINE

[75] Inventor: Gregor Pennig, Munich, Germany

[73] Assignee: MTU Motoren-Und Turbinen Union Munchen GmbH, Munich, Germany

[21] Appl. No.: 636,831

[22] Filed: Dec. 1, 1975

[30] Foreign Application Priority Data

Dec. 4, 1974 Germany .......................... 2457231

[51] Int. Cl.² .................................................. F01D 5/04
[52] U.S. Cl. .................................... 416/244 A; 416/135
[58] Field of Search ................ 416/135, 244, 244 A, 416/183, 95; 403/28, 291, 358, 372-374

[56] References Cited

U.S. PATENT DOCUMENTS

| | | | |
|---|---|---|---|
| 1,873,956 | 8/1932 | Dahlstrand | 416/220 X |
| 2,115,031 | 4/1938 | Meininghaus | 416/244 A |
| 2,296,862 | 9/1942 | Meininghaus | 416/244 A |
| 2,738,125 | 3/1956 | Ledwith | 416/244 A |
| 2,801,070 | 7/1957 | Purvis et al. | 416/244 A |
| 2,818,228 | 12/1957 | Petrie | 416/244 A |
| 2,912,155 | 11/1959 | Buchi | 416/244 A |
| 2,940,658 | 6/1960 | Birmann | 416/135 |
| 3,051,437 | 8/1962 | Morley et al. | 416/244 A X |
| 3,304,052 | 2/1967 | Warner et al. | 416/244 A X |
| 3,677,663 | 7/1972 | Cronstedt | 416/244 A X |

FOREIGN PATENT DOCUMENTS

| | | | |
|---|---|---|---|
| 47,869 | 8/1937 | France | 416/244 A |
| 376,136 | 10/1939 | Italy | 416/244 A |
| 30,048 | 8/1970 | Japan | 416/244 A |
| 214,200 | 2/1925 | United Kingdom | 416/244 A |
| 219,655 | 10/1924 | United Kingdom | 416/244 A |

*Primary Examiner*—Everette A. Powell, Jr.
*Attorney, Agent, or Firm*—Haseltine, Lake & Waters

[57] ABSTRACT

An impeller for a high-speed turbomachine, in which the impeller includes a hub which is frictionally fastened on a shaft of the machine by a tapered fit. A resilient, axially extending connecting portion of the hub is interposed between the impeller and hub and is welded to the impeller. The impeller encompasses the shaft and the hub so as to form a narrow radial gap therebetween.

6 Claims, 1 Drawing Figure

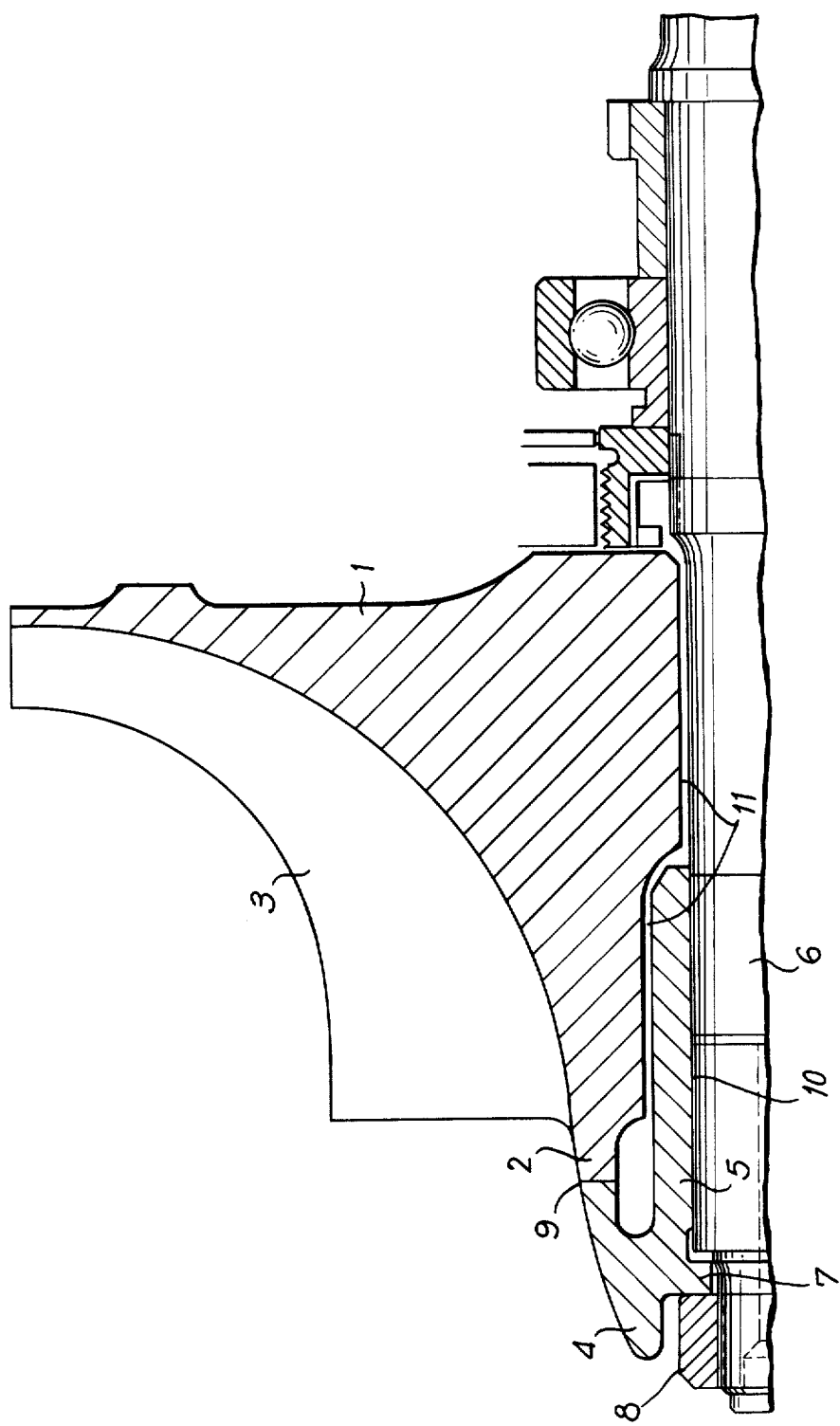

IMPELLER FOR A HIGH-SPEED TURBOMACHINE

FIELD OF THE INVENTION

The present invention relates to an impeller for a highspeed turbomachine, the impeller having a hub which is frictionally fastened on a shaft by means of a tapered fit; and including a resilient, axially extending connecting portion which is interposed between the body of the impeller and the hub.

DISCUSSION OF THE PRIOR ART

An impeller or runner of the above-mentioned type has been disclosed, for instance, in Austrian Pat. No. 74,465, where a sleeve-like axial connecting member intervening between the body of the impeller and the hub affords the solution in avoiding difficulties associated with the mounting of a cantileversupported turbine rotor disk, in that a portion of the disk comes to lie in a plane extending perpendicular to the shaft, which passes in proximity the support or bearing, through the utilization of the axial connecting member.

SUMMARY OF THE INVENTION

Accordingly, it is an object of the present invention to provide a centrifugal impeller which is suitable for high speeds and designed for maximum strength and which, notwithstanding its primarily frictional connection with the shaft, will exclude the danger of loosening at high speeds, while additionally attaining economy in the cost of the production of the impeller wheel.

It is a particular object of the present invention to provide an impeller exhibiting the following combination of features:

a. the impeller is of the centrifugal type;

b. the hub is elongate cylindrical sleeve projecting into the impeller wheel in an axial direction;

c. the impeller wheel encompasses the shaft and the hub at a narrow radial gap therebetween;

d. the hub is provided, at the axial end thereof which is remote from the impeller wheel, with a thin-walled, outwardly extending cylindrical connecting portion, and which is welded at its free end to the impeller wheel.

Through the combination of these inventive features it is possible to attain the object, namely safely secure a centrifugal impeller onto a shaft without the danger of assuming excessive stresses in the impeller bore, in an ideal manner, in that on the other hand a small bore can be maintained in the impeller to minimize stresses at its inner periphery, which is of particular importance in the case of bulky and thereby inherently heavy impeller bodies of centrifugal impellers, and on the other hand, minimize the total axial length of the impeller, which in any case is much greater in centrifugal impellers in comparison with that of axial-flow wheels, notwithstanding the use of a hub which is separate from the wheel. These advantages can only be obtained through the two-part construction of the wheel body and hub, and the subsequent welding together of these two portions.

It is namely known from Swiss Pat. No. 170,550 that rotating parts which are secured on turbine shafts merely through friction only, may be provided with extensions which are coaxial relative to the shaft, at which the shaft and rotating part are welded to each other. However, the arrangements shown therein generally relate to disk-shaped rotating parts with a comparably shorter axial length, in which it is no longer so important to provide axial extensions through which the over-all axial length of such rotating part is increased. Moreover, these arrangements are also subject to the disadvantage in that they no longer relate to detachable shaft and hub connections, thereby rendering impossible the replacement of the there illustrated rotating part.

A further feature of the present invention includes welding of the cylindrical sleeve-like connecting part by means of a friction weld. Friction welding permits the use of dissimilar materials for the disk and the annular or ring-shaped component which, in the present case, is advantageous insofar as the impeller wheel body may then be constituted of a casting whereas the hub, as usual, may be a forging. Moreover, the friction welding is an extremely economical method of joining rotating parts.

BRIEF DESCRIPTION OF THE DRAWING

Further objects and advantages of the present invention will become apparent from the following detailed description in conjunction with the accompanying single FIGURE of the drawing which illustrates an embodiment of an apparatus with approximately full-sized aluminum compressor rotor which is secured in position on a shaft.

DETAILED DESCRIPTION

Referring now to the single FIGURE of the drawing, the centrifugal impeller consists of a wheel 1, blades 3, and a hub 5. Hub 5 at its axial end remote from wheel 1, includes a thin-walled, cylindrical sleeve-like connecting member 4 which is welded at its free end (connection 9) to an end-faced projection 2 of the impeller body 1. Hereby the cylindrical sleevelike connecting member 4 is so shaped as to provide a contour suitable for the inlet flow. Hub 5 is secured by means of its tapered inner bore 10 on a mating tapered on conical section of shaft 6 through the intermediary of an interference fit. The impeller is axially arrested by a stop ring 7 and a nut 8. The impeller wheel body encompasses shaft 6 and hub 5 with a narrow radial gap 11 therebetween.

While there has been shown what is considered to be the preferred embodiment of the invention, it will be obvious that modifications may be made which come within the scope of the disclosure of the specification.

What is claimed is:

1. In an impeller wheel for a high-speed turbomachine having a shaft; and a hub frictionally fastened on said shaft through a tapered fit therebetween; the improvement comprising the combination of:

a. said impeller wheel being a centrifugal radially-shaped impeller having a predetermined width;

b. said hub being an elongate cylindrical sleeve extending into said impeller wheel in an axial direction;

c. said impeller wheel encompassing said shaft and said hub so as to form a narrow radial gap therebetween; and d. said hub at the axial end thereof remote from said impeller wheel including a thin-walled, cylindrical connecting part extending radially outwardly and being welded at its free end to said impeller wheel, said hub being an elongated cylindrical sleeve extending partly into a central bore of said impeller wheel in an axial direction.

2. An impeller as claimed in claim 1, wherein said cylindrical connecting part is friction-welded to said impeller wheel 3. An impeller according to claim 1 wherein said impeller comprises a wheel with a substantially thin web in relation to the length of said hub along the axis of said shaft; said wheel carrying blades; said connecting part having a nose-shaped portion spaced from the weld between said wheel and said connecting part for directing through it flow relative to said blades.

4. An impeller according to claim 1 wherein said connecting part has a nose-shaped portion spaced from the weld between said impeller wheel and said connecting part for directing through it flow relative to said impeller wheel; said connecting part having a ring-shaped projecting portion extending towards the axis of said shaft; and a threaded nut on said shaft and bearing against said ring-shaped portion, said ring-shaped portion being a stop and locating said hub on said shaft in predetermined position.

5. An impeller according to claim 1 wherein said radial gap comprises a gap portion between said shaft and part of said impeller wheel and a second gap portion connected to said first gap portion and extending between said hub and a further part of said impeller wheel.

6. An impeller according to claim 1 wherein said impeller comrpises a wheel with a substantially thin web in relation to the length of said hub along the axis of said shaft; said wheel carrying blades, said connecting part having a nose-shaped portion spaced from the weld between said wheel and said connecting part for directing fluid flow relative to said blades; said connecting part having a ring-shaped projection portion extending toward the axis of the shaft; and a threaded nut on said shaft and bearing against said ring-shaped portion, said ring-shaped portion being a stop and locating said hub on said shaft in predetermined position, said radial gap comprising a first gap portion between said shaft and part of said wheel and a second gap portion connected to said first gap portion and extending between said hub and a further part of said wheel, said gap terminating in a substantially wider internal annular space communicating with said connecting part and said further part of said wheel, said impeller having a central bore of substantially small diameter located radially inwards of the main mass of said impeller for reducing circumferential stresses along said bore arising from centrifugal forces, said narrow radial gap being said bore and said shaft, said hub being held on said shaft only by friction, said hub having a substantially small mass for inhibiting enlargement of said hub by centrifugal forces and loosening the frictional connection between said hub and said shaft, said hub extending into said central bore of that part of said impeller having relatively low mass.

* * * * *